April 5, 1949.　　　　V. WEBER　　　　2,466,522

CONTROL DEVICE

Original Filed Aug. 6, 1943

INVENTOR
Victor Weber.
BY
HIS ATTORNEY

Patented Apr. 5, 1949

2,466,522

UNITED STATES PATENT OFFICE 2,466,522

CONTROL DEVICE

Victor Weber, Greensburg, Pa., assignor to Robertshaw-Fulton Controls Company, a corporation of Delaware Original application August 6, 1943, Serial No. 497,613. Divided and this application February 9, 1946, Serial No. 646,628

4 Claims. (Cl. 200—140)

This invention relates to control devices and, more particularly, to thermostatically operated electric switches for temperature control. The invention is particularly applicable, although not limited, to the regulation of the temperature of the cooling system of motor driven vehicles such as aircraft.

This application is a division of my copending application Serial No. 497,613, filed August 6, 1943, now Patent No. 2,459,350, granted January 18, 1949, to which further reference may be had for a description of the complete temperature controlling system. The automatic control of temperature is conveniently performed through the medium of a liquid-filled container subjected to the temperature of the cooling system and operatively connected to an expansible and contractible element which opens and closes an electric switch at predetermined temperatures. This structure constituting a thermostatic switch is under control of a reciprocable element driven from the motor which operates the shutter or cowl flap actuating mechanism of the vehicle and hence constitutes a thermostatic follow-up device to accomplish the desired result.

An object of this invention is to render the device substantially unaffected by vibration such as is encountered in the operation of the aircraft.

Another object of the invention is to minimize the effect of inertia forces which would affect the operation of the device during high-speed travel of the aircraft.

Other objects and advantages will become apparent from the following description taken in connection with the accompanying drawing, wherein.

Figures 1, 2:
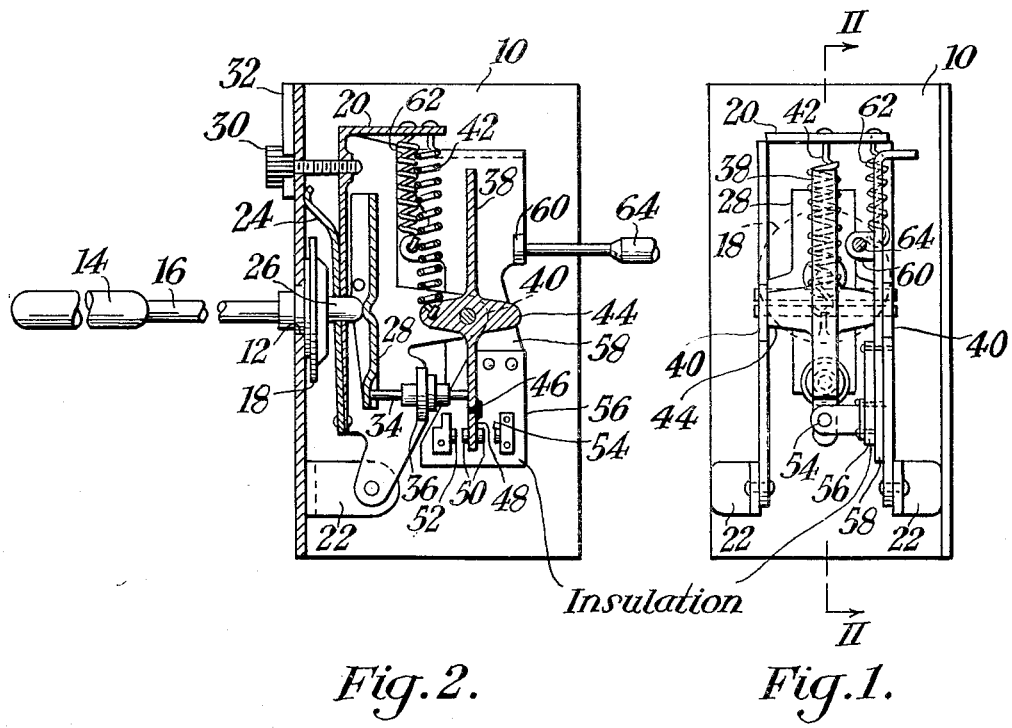
Fig. 1 is a front elevation of a control device embodying the invention.
Fig. 2 is a section taken on the line II—II of Fig. 1.

Referring more particularly to the drawing, the main frame 10 of the device which may be of angular form is provided with an aperture 12 in one wall thereof through which a portion of the thermal unit of the mechanism projects. The thermal unit comprises a bulb 14, capillary tubing 16 and an expansible diaphragm 18 constituting a fluid type actuator. The diaphragm 18 is supported on the interior of the frame 10 while the bulb 14 and capillary tubing 16 are located exteriorly thereof. It will be understood that the capillary tubing 16 may be of any desired length so that the bulb 14 is adapted for immersion in the cooling liquid which circulates through the radiator of the aircraft. Hence, the device operates by changes in temperature at the bulb 14 causing expansion or contraction of the fluid therein and corresponding expansive or contractive movement of the diaphragm 18.

A sub-frame 20 of channel form in cross-section is pivotally mounted at one end on lugs 22 projecting inwardly of the frame 10 and is urged away from the adjacent wall of the sub-frame 20 by a leaf spring 24. The spring 24 is secured at one end to the sub-frame 20 and has its opposite free end engaging the wall of the main frame 10. Both the spring 24 and the sub-frame 20 are suitably apertured to permit a button 26 carried by the diaphragm to pass freely therethrough into engagement with an operating or thermostat lever 28. To counteract the bias of the spring 24 on the sub-frame 20 a calibrating screw 30 may threadedly engage the frame 10 at the end opposite the pivotal mounting thereof and extends through the wall of the frame 20 for convenient access from the exterior. An indicator plate 32 is carried on the frame 10 in operative engagement with the calibrating screw 30 to indicate the extent of adjustment of the frame 20.

The thermostat lever 28 is pivotally mounted between the side walls of the channel shaped sub-frame 20 and is engaged on one side of its pivotal mounting by the button 26 of the thermal unit. Preferably, the pivotal mounting of the thermostat lever 28 is located on the axis thereof and the lever is thus supported in substantial balance or equilibrium on either side of the pivotal mounting. The button 26 which engages the lever 28 is offset from the pivot and the engaged side of the lever relative to the pivot also engages a pin 34 on the opposite surface to that engaged by the button 26. The pin 34 is mounted in a suitable bearing 36 formed inwardly of one side wall of the sub-frame 20 for reciprocation in a direction parallel with the axis of the diaphragm button 26. The opposite end of the pin 34 engages with a switch arm or blade 38 which is pivotally mounted on oppositely disposed ears 40 projecting from the side walls of the sub-frame 20. As in the case of the thermostat lever 28 the switch blade 38 is pivotally mounted on its axis for obtaining substantial balance therein.

A coil spring 42 is operative between an end wall of the sub-frame 20 and one end of a lug 44 formed on the switch blade 38 on either side of the pivotal mounting. Preferably, the lug 44 is symmetrical about the pivotal mounting of the switch blade 38 in order to maintain this element in substantial balance as described. The coil spring 42 serves to bias the switch blade 38 toward the pin 34 whereas expansive movement of the diaphragm 18, communicated through the button 26 to the thermostat lever 28, will serve to oppose this bias. The end of the switch blade 38 beyond the portion engaged by the pin 34 is insulated from the other portion. The insulation may be in the form of an insert 46 to which a depending contact carrying portion 48 is secured. The portion 48 carries on opposite sides thereof a pair of contacts 50 which are adapted for engagement alternatively upon angular movement of the switch blade 38 with contacts 52 and 54.

The contacts 52 and 54 are mounted upon insulation 56 carried by a contact arm 58 which is interposed between the switch blade 38 and the ear 40 on one side of the frame 20. The contact arm 58 may be pivoted on the sub-frame 20 in common with the switch blade 38. An abutment 60 is formed on the contact arm 58 on the side of its pivotal mounting opposite the contacts 52 and 54 and the arm 58 is biased for clockwise movement, as viewed in Fig. 2, by a coil spring 62 operative between the sub-frame 20 and an anchorage on the contact arm 58 on the same side of the pivotal mounting as the abutment 60. As in the case of the thermostat lever 28 and the switch blade 38, the contact arm 58 is preferably pivotally mounted on its axis for obtaining substantial balance therein.

The abutment 60 on the contact arm 58 is adapted to be engaged by a reciprocable member comprising a projecting portion 64 of a travelling spindle (not shown) and is urged into such relation by means of the coil spring 62. As described in the copending application previously referred to, the travelling spindle is driven from the motor of the cowl flap actuator and will cause pivotal movement of the contact arm 58 and consequent movement of the contacts 52 and 54 thereon with respect to the switch blade contacts 50. It will be apparent that other means for operating the contact arm 58 could be employed including manual actuation, if desired. It will further be apparent that the use of two pairs of contacts as disclosed herein is required only when a reversible motor is to be controlled and that a lesser number of contacts is not excluded from the scope of this invention.

In the operation of the device it may be assumed that the temperature of the liquid in the cooling system rises and the bulb 14 which is immersed in the liquid communicates the temperature rise to the diaphragm 18 causing expansion thereof. The button 26 thereupon moves the thermostat lever 28 counter-clockwise on its pivot and the switch blade 38 is thereby moved by the pin 34 against the bias of the spring 42 into position with the contacts 50 and 54 engaged. If the motor is energized in response to engagement of contacts 50 and 54 then longitudinal movement of the projecting portion 64 of the travelling spindle toward the left as viewed in Fig. 2 will occur. The contact arm 58 is therefore moved on its pivot in a counter-clockwise direction against the bias of the spring 62 while switch blade 38 maintains contacts 50 and 54 in engagement. After this operation has continued long enough for the contact arm 58 to be moved a sufficient distance in a counter-clockwise direction, as viewed in Fig. 2, by the projecting portion 64 then the contacts 50 and 54 will be opened in the event that the diaphragm 18 has ceased expanding and switch blade 38 remains stationary.

When the liquid in the cooling system to which the bulb 14 is exposed becomes cooler and the diaphragm 18 contracts, then the thermostat lever 28 will be rotated clockwise and will cause switch blade 38 to close contacts 50 and 52 of the thermostat mechanism. The operation of the motor in a reverse direction is thus initiated until sufficient retraction of the projecting portion 64 of the travelling spindle causes clockwise movement of the contact arm 58 and consequent disengagement of the engaged contacts 50, 52. As the device will operate in the same manner whether the contacts 50, 52 or 50, 54 are engaged, further description is deemed unnecessary.

From the foregoing it will be apparent that the thermostat lever 28, switch arm 38 and contact arm 58 are all in substantial balance as described and, accordingly, the operation thereof should be unaffected by the conditions under which the device is used. In aircraft or other vehicles, the unavoidable vibration of the vehicle transmitted to the thermostat mechanism may have deleterious effects but these are minimized by the application of the principles of this invention. It will be apparent that various changes may be made in the arrangement and combination of parts and in the details of construction within the scope of the appended claims without departing from the spirit of the invention.

I claim:

1. Switching mechanism comprising a frame, an operating lever pivoted at the median portion in said frame for defining operating and free ends on said lever, a switch arm pivoted at the median portion in said frame for defining operating and free ends on said switch arm, said switch arm having its operating end operatively engaging said operating end of said lever, said lever and switch arm having said operating and free ends thereof in substantial balance about their respective pivots, and switch contact means carried by said frame for operative association with said operating end of said switch arm when the latter is moved on its pivot by said lever.

2. Switching mechanism comprising a frame, an operating lever pivoted at the median portion in said frame for defining operating and free ends on said lever, a switch arm pivoted at the median portion in said frame for defining operating and free ends on said switch arm, said switch arm having its operating end operatively engaging said operating end of said lever, a contact arm pivoted at the median portion in said frame for defining operating and free ends on said contact arm; said lever, switch arm and contact arm having said operating and free ends thereof in substantial balance about their respective pivots; a contact carried by said operating end of said contact arm for operative association with said switch arm when the latter is moved on its pivot by said lever, and means operatively engageable with said free end of said contact arm for moving said contact arm to discontinue said association.

3. Switching mechanism comprising a frame, a thermostat lever pivoted on its axis in said frame for defining operating and free ends on said lever, thermostat means in said frame and engageable with said operating end for operating said lever, a switch arm pivoted on its axis in said frame for defining operating and free ends on said switch arm, said switch arm having its operating end operatively engaging said operating end of said lever, means for biasing said switch arm towards said lever, a contact arm pivoted on its axis in said frame for defining operating and free ends on said contact arm; said lever, switch arm and contact arm having said operating and free ends thereof in substantial balance about their respective pivots; spaced contacts carried by said operating end of said contact arm and disposed on either side of said operating end of said switch arm, means for biasing said contact arm toward contact engagement on one side thereof with said switch arm, and a reciprocable member operatively engaging said free end of said contact arm and opposing said biasing means therefor, the arrangement being such that operation of said thermostat lever against the bias of said switch arm tends to cause contact engagement on one side of said switch arm while operation of said contact arm against its biasing means tends to oppose such contact engagement.

4. A thermostatic control device comprising a main frame, a sub-frame pivotally mounted in said main frame and biased in one direction, adjusting means carried by said main frame for positioning said sub-frame therein against said bias, a thermostat lever pivotally mounted on its axis in said sub-frame, thermostat means carried by said main frame and operatively engaging said thermostat lever on one side of the pivotal mounting therefor, a switch arm pivotally mounted on its axis in said sub-frame and spaced from said thermostat lever, means mounted in said frame for reciprocable movement between said lever and switch arm and on the same side of said pivotal mounting as said thermostat means, means extending between said sub-frame and switch arm for biasing the latter toward the thermostat lever and maintaining said switch arm and lever in engagement with said reciprocable means at opposite ends thereof, a contact arm pivoted on its axis in said sub-frame; said lever, switch arm and contact arm being in substantial balance about their respective pivots; spaced contacts carried by said contact arm and disposed on either side of said switch arm, means for biasing said contact arm toward contact engagement on one side thereof with said switch arm, and a reciprocable member operatively engaging said contact arm and opposing said biasing means therefor, the arrangement being such that operation of said thermostat lever against the bias of said switch arm tends to cause contact engagement on one side of said switch arm while operation of said contact arm against its biasing means tends to oppose such contact engagement.

VICTOR WEBER.

REFERENCES CITED

The following references are of record in the file of this patent:

UNITED STATES PATENTS

| Number | Name | Date |
| --- | --- | --- |
| 2,344,535 | Clark | Mar. 21, 1944 |
| 2,354,364 | Chapman | July 25, 1944 |